United States Patent
Liu et al.

(10) Patent No.: US 10,116,420 B2
(45) Date of Patent: Oct. 30, 2018

(54) ERROR RETRANSMISSION MECHANISM-COMPRISED METHODS, APPARATUSES AND SYSTEMS FOR TRANSMITTING AND RECEIVING VISIBLE LIGHT SIGNAL

(71) Applicant: KUANG-CHI INTELLIGENT PHOTONIC TECHNOLOGY LTD., Shenzhen (CN)

(72) Inventors: Ruopeng Liu, Shenzhen (CN); Linyong Fan, Shenzhen (CN)

(73) Assignee: KUANG-CHI INTELLIGENT PHOTONIC TECHNOLOGY LTD., Shenzhen (CN)

(*) Notice: Subject to any disclaimer, the term of this patent is extended or adjusted under 35 U.S.C. 154(b) by 232 days.

(21) Appl. No.: 15/011,553

(22) Filed: Jan. 30, 2016

(65) Prior Publication Data

US 2016/0156434 A1 Jun. 2, 2016

Related U.S. Application Data

(63) Continuation of application No. PCT/CN2014/080249, filed on Jun. 18, 2014.

(30) Foreign Application Priority Data

Jul. 31, 2013 (CN) .......................... 2013 1 0329631

(51) Int. Cl.
- *H04L 1/08* (2006.01)
- *H04B 10/116* (2013.01)
- *H04L 1/02* (2006.01)

(52) U.S. Cl.
CPC .............. *H04L 1/08* (2013.01); *H04B 10/116* (2013.01)

(58) Field of Classification Search
CPC ....... H04L 1/08; H04L 1/1657; H04L 1/1816; H04L 1/1809; H04B 10/116
See application file for complete search history.

(56) References Cited

U.S. PATENT DOCUMENTS 4,287,508 A * 9/1981 Arita .................. H04Q 9/14
340/4.21
4,536,875 A * 8/1985 Kume .................. H04L 12/413
370/448

(Continued)

FOREIGN PATENT DOCUMENTS

CN 101512925 A 8/2009
CN 101547080 A 9/2009

(Continued)

OTHER PUBLICATIONS

Leti, Optics and Photonics, CEA, Annual Research Report, 2011, pertinent pp. 1, 7, 59.*

*Primary Examiner* — April Y Blair
*Assistant Examiner* — Dipakkumar B Gandhi
(74) *Attorney, Agent, or Firm* — Perkins Coie LLP

(57) ABSTRACT

The present application relates to error retransmission mechanism-included methods, apparatuses, and systems for transmitting and receiving a visible light signal. The transmitting method includes the following steps: during transmission of a visible light signal, when an emitter executes signal transmission on an error sensitive level each time, reading an execution duration of the emitter; comparing the execution duration with a signal duration range; when the execution duration does not fall within the signal duration range, performing signal retransmission; and when the execution duration falls within the signal duration range, continuing signal transmission.

13 Claims, 9 Drawing Sheets

(56) References Cited

U.S. PATENT DOCUMENTS

| | | | | |
|---|---|---|---|---|
| 6,121,993 | A * | 9/2000 | Maekawara | H04N 1/0671 250/205 |
| 6,307,723 | B1 * | 10/2001 | Hindle | H02H 3/081 361/63 |
| 8,254,481 | B1 * | 8/2012 | McCloskey | H04K 1/10 375/130 |
| 8,564,471 | B1 * | 10/2013 | Gao | G04F 10/005 341/155 |
| 2003/0231727 | A1 * | 12/2003 | Ito | H04L 1/20 375/364 |
| 2006/0034315 | A1 * | 2/2006 | Maekawa | H04W 8/005 370/432 |
| 2006/0062140 | A1 * | 3/2006 | Sudo | H04L 1/0006 370/203 |
| 2006/0062582 | A1 * | 3/2006 | Suzuki | H04B 10/502 398/183 |
| 2007/0146282 | A1 * | 6/2007 | Choo | G09G 3/3659 345/98 |
| 2009/0232502 | A1 * | 9/2009 | Miyashita | H04B 10/1143 398/79 |
| 2009/0290463 | A1 * | 11/2009 | Kuze | G11B 7/00375 369/53.17 |
| 2010/0259347 | A1 * | 10/2010 | Ziegler | H01H 83/04 335/14 |
| 2011/0126068 | A1 * | 5/2011 | Lee | H04L 1/1607 714/748 |
| 2011/0211843 | A1 * | 9/2011 | Tan | H04B 10/278 398/141 |
| 2012/0230703 | A1 | 9/2012 | Yamada et al. | |
| 2013/0136456 | A1 * | 5/2013 | Yoo | H04B 10/116 398/118 |
| 2015/0282146 | A1 * | 10/2015 | Nigam | H04L 1/1812 370/329 |

FOREIGN PATENT DOCUMENTS

| | | |
|---|---|---|
| CN | 101827439 A | 9/2010 |
| CN | 102047746 A | 5/2011 |
| CN | 102693567 A | 9/2012 |
| CN | 102957513 A | 3/2013 |
| CN | 103021051 A | 4/2013 |
| CN | 103023612 A | 4/2013 |
| CN | 103795464 A | 5/2014 |
| JP | 2008-022503 A | 1/2008 |
| JP | 2009-005304 A | 1/2009 |
| JP | 2013-505640 A | 2/2013 |
| WO | 2012097885 A1 | 7/2012 |

* cited by examiner

ERROR RETRANSMISSION MECHANISM-COMPRISED METHODS, APPARATUSES AND SYSTEMS FOR TRANSMITTING AND RECEIVING VISIBLE LIGHT SIGNAL

CROSS REFERENCE TO RELATED APPLICATIONS

This application is a continuation of PCT Application No. PCT/CN2014/080249 filed on Jun. 18, 2014, which claims priority to Chinese Patent Application No. 201310329631.3 of Jul. 31, 2013, all of which are incorporated herein by reference.

TECHNICAL FIELD OF THE INVENTION

The present application relates to the visible light communication field, and in particular, to error retransmission mechanism-included methods, apparatuses, and systems for transmitting and receiving a visible light signal.

BACKGROUND OF THE INVENTION

Visible light communication is an emerging short-range high-speed wireless light communications technology that is developed on a basis of an LED technology. A basic principle of visible light communication is that communication is performed by flashing an LED light source at a high frequency based on a characteristic that a switching speed of a light emitting diode (LED) is higher than that of a fluorescent lamp and an incandescent lamp. Presence of light represents binary 1, and absence of light represents binary 0. Information may be obtained after a high-speed light signal that includes digital information undergoes photoelectric conversion. In the wireless light communications technology, data is unlikely to be interfered with or captured, and an optical communication device can be easily made and is unlikely to be damaged or degaussed. Therefore, the wireless light communications technology can be used to make a wireless optical encryption key. Compared with microwave technologies, the wireless light communication has abundant spectrum resources, which is incomparable with general microwave communication and wireless communication. In addition, the visible light communication is applicable to any communications protocol, and applicable to any environment. In terms of security, in contrast to conventional magnetic materials, there is no need to worry about a problem of degaussing or even to worry about unlawful interception of communication content; and a wireless optical communication device features flexible and convenient installation and layout, and a low cost, and is applicable to large-scale popularity and application.

With fast promotion of visible light communication, a technology of using an LED (light emitting diode) of an electronic device to transmit a visible light signal has been proposed. In the electronic device, a duration in which the LED is on and a duration in which the LED is off may be controlled, where on and off may respectively indicate a high level and a low level. Therefore, a specially set encoding mode may be used to achieve an objective of transmitting, by the LED, a visible light signal that represents data information. However, during practice, the inventors of the present application find that reliability of information transmitted in a conventional method is lower than an expected value.

SUMMARY

A technical problem to be solved by embodiments of the present application is to provide error retransmission mechanism-included methods, apparatuses, and systems for transmitting and receiving a visible light signal to improve accuracy of information transmission.

A technical solution provided by the embodiments of the present application to solve the foregoing technical problem is to provide an error retransmission mechanism-included method for transmitting a visible light signal, where the method includes the following steps: during transmission of a visible light signal. Every time when a light emitting diode executes signal transmission on an error sensitive level, read an execution duration of the light emitting diode. Comparing the execution duration with a signal duration range; when the execution duration does not fall within the signal duration range, performing signal retransmission; and when the execution duration falls within the signal duration range, continuing signal transmission.

The embodiments of the present application further provide an error retransmission mechanism-included method for receiving a visible light signal, where the method includes the following steps: receiving a visible light signal and converting it into an electrical signal; detecting a level of the electrical signal; when detecting that a duration of an error sensitive level in the electrical signal falls within a signal duration range, recording the error sensitive level; when detecting that the duration of the error sensitive level in the electrical signal does not fall within the signal duration range, not recording the error sensitive level; converting recorded levels into binary data respectively; and combining the binary data.

The embodiments of the present application further provide an error retransmission mechanism-included apparatus for transmitting a visible light signal, where the apparatus includes: a module configured to read an execution duration of an emitter during transmission of a visible light signal when the emitter executes signal transmission on an error sensitive level each time; a module configured to compare the execution duration with a signal duration range; a module configured to perform signal retransmission when the execution duration does not fall within the signal duration range; and a module configured to continue signal transmission when the execution duration falls within the signal duration range.

The embodiments of the present application further provide an error retransmission mechanism-included apparatus for receiving a visible light signal, where the apparatus includes: a module configured to receive a visible light signal and convert it into an electrical signal; a module configured to detect a level of the electrical signal; a module configured to record an error sensitive level when it is detected that a duration of the error sensitive level in the electrical signal falls within a signal duration range; a module configured not to record the error sensitive level when it is detected that the duration of the error sensitive level in the electrical signal does not fall within the signal duration range; a module configured to convert recorded levels into binary data respectively; and a module configured to combine the binary data.

The embodiments of the present application further provide a photonic key, including the foregoing error retransmission mechanism-included apparatus for transmitting a visible light signal.

The embodiments of the present application further provide a photonic controlled end, including the foregoing error retransmission mechanism-included apparatus for receiving a visible light signal.

The embodiments of the present application further provide an authentication system, including the foregoing photonic key and photonic controlled end.

The embodiments of the present application further provide an authentication system, including the foregoing error retransmission mechanism-included apparatus for transmitting a visible light signal and the foregoing error retransmission mechanism-included apparatus for receiving a visible light signal.

Compared with the prior art, because a transmission error may be detected and retransmission is performed, the embodiments of the present application may improve reliability of communication between a transmit end and a receive end of a visible light signal, and thereby improve the user experience.

BRIEF DESCRIPTION OF DRAWINGS

To make the foregoing objectives, features, and advantages of the present application more comprehensible, the following describes the embodiments of the present application in detail with reference to accompanying drawings.

DESCRIPTION OF EMBODIMENTS

Figure 1:
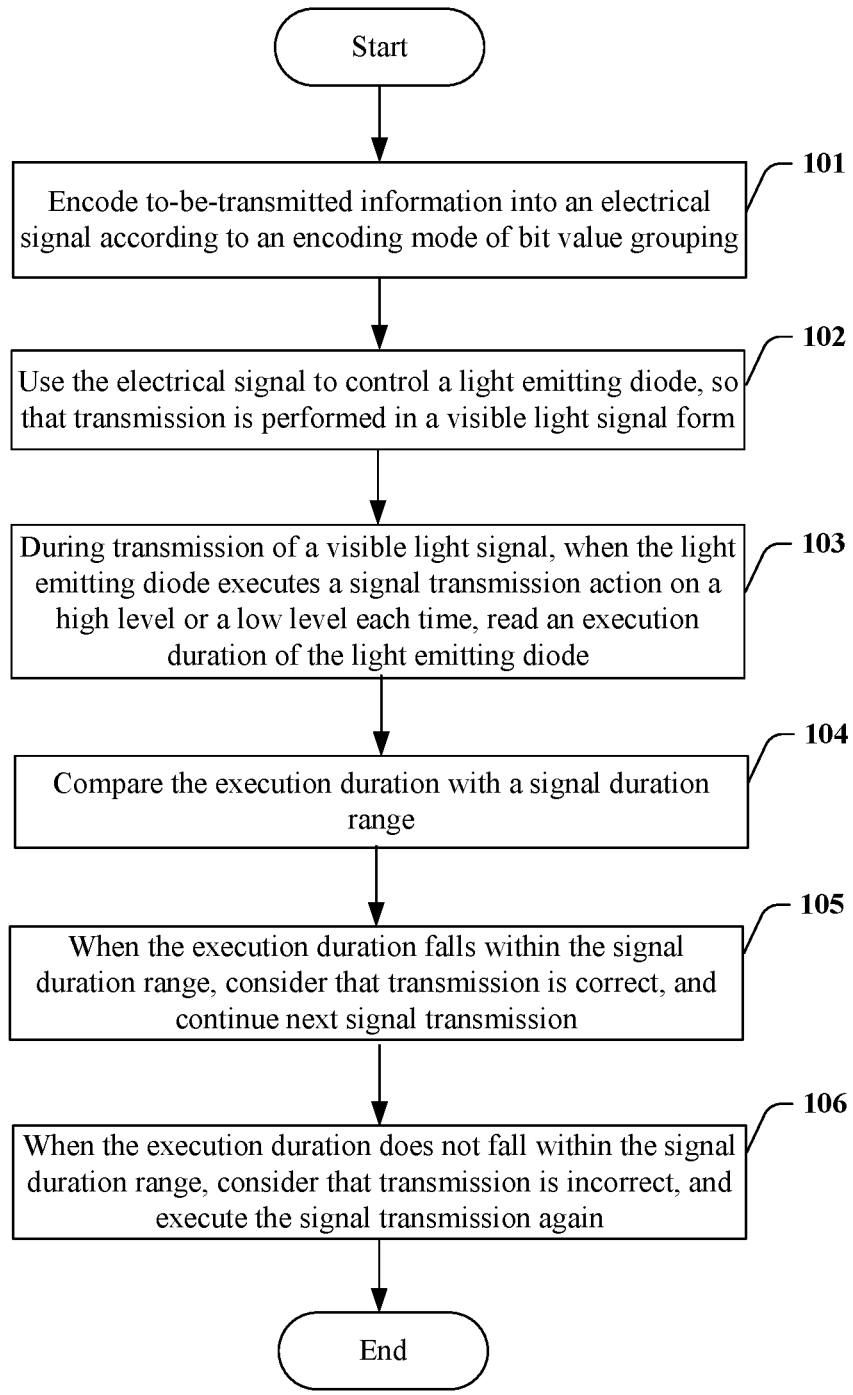
FIG. 1 shows a flowchart of an error retransmission mechanism-included method for transmitting a visible light signal according to Embodiment 1 of the present application.

In brief, the embodiments of the present application provide error retransmission mechanism-included methods for transmitting and receiving a visible light signal.

After further research, it is found that a cause of poor transmission reliability of visible light communication based on an LED is that there is a random delay in controlling flashing of the LED, that is, durations of on and off states are sometimes longer than an expected value. According to a conventional encoding technology, communication is performed by flashing an LED at a high frequency, where presence of light represents binary 1, and absence of light represents binary 0. However, when a duration representing a binary bit 0 in a state of absence of light exceeds an set value, an excess of the duration is identified as another binary bit 0, causing a reception error.

A method for overcoming the foregoing problem is to use a new encoding mode. For example, from a perspective of a light signal, a state change between presence of light and absence of light, rather than the state of presence or absence of light itself, is used to represent information. From a perspective of an electrical signal, a level transition rather than a level duration state itself is used to represent information.

In this way, during encoding, to-be-transmitted information may be divided into multiple information units, where each information unit includes one or multiple bits; and then these information units are converted into multiple electrical signal units, where for each electrical signal unit, a quantity of level transitions is used to represent the bits of a corresponding information unit. An inter-group interval indicated by a fixed level exists between adjacent electrical signal units. The level transitions may include only low-level to high-level transitions, or include only high-level to low-level to transitions, or may include low-level to high-level transitions and high-level to low-level to transitions.

A duration (herein referred to as a first level duration) of a level in each electrical signal unit and a duration (herein referred to as a second level duration) of a level between adjacent electrical signal units are set. The second level duration is greater than the first level duration. This magnitude relationship is so significant that it can be correctly identified by a receive end.

At the receive end, a decoding process is reverse. The receive end receives a visible light signal and converts it into an electrical signal; when detecting a level transition, the receive end determines that an electrical signal unit begins; when a detected level duration is greater than a first threshold but less than or equal to a second threshold, the receive end records a quantity of level transitions; when a detected level duration is greater than the second threshold but less than or equal to a third threshold, the receive end determines that the electrical signal unit ends; and when a detected level duration is greater than the third threshold, the receive end determines that the signal is received completely, where the third threshold is greater than the second threshold, and the second threshold is greater than the first threshold. It is understandable that the first threshold, the second threshold, and the third threshold are set with reference to the foregoing first level duration and second level duration.

After the reception is completed, the received electrical signal units are converted into information units, and then multiple information units are combined into information. Thereby, original information represented by the visible light signal is obtained.

It is understandable that there is at least one level transition. Therefore, an electrical signal unit is indicated by a level transition rather than a level duration state, even if all bit values in the electrical signal unit are 0.

However, the foregoing encoding and decoding methods still have potential disadvantages. When an unexpected random delay duration exceeds the second threshold, the random delay duration is identified as an inter-group interval between adjacent electrical signal units. In this case, the receive end still cannot identify information correctly.

Therefore, regardless of the conventional encoding mode or the encoding mode of bit value grouping, it is necessary to overcome an error caused by a random delay of a light emitting diode.

According to a conception of the embodiments of the present application, an error retransmission mechanism-included method for transmitting a visible light signal is provided. According to the method, first, to-be-transmitted information is encoded into an electrical signal according to an encoding mode. Then a signal duration range is set for a light emitting diode used as an emitter to perform signal transmission on an error sensitive level. Herein, error sensitive levels refer to those levels having abnormal durations that may cause an identification error at a receive end. Using the encoding mode of bit value grouping as an example, a fixed level is sometimes used as an inter-group interval between adjacent electrical signal units. Because the inter-group interval is a mark for identifying the end of an electrical signal unit, in the electrical signal unit, if a level having a same level value as the fixed level is incorrectly continued for a time approximately equal to that of the fixed level, the time is incorrectly identified as an inter-group interval between adjacent electrical signal units. Therefore, in the electrical signal unit, the level having the same level value as the fixed level is an error sensitive level for the receive end. In the encoding mode of bit value grouping, fixed levels may be only low levels, or may be only high levels, or may be high levels and low levels. In these cases, the error sensitive levels may correspondingly be low levels or high levels in the electrical signal unit, or may include high levels and low levels at the same time.

Afterward, the electrical signal is used to control the light emitting diode, so that transmission is performed in a visible light signal form. During transmission of the visible light signal, when the light emitting diode executes signal transmission on an error sensitive level each time, an execution duration of the light emitting diode is read. The signal transmission of the light emitting diode at a time may include a turn-on action or a turn-off action. Then the execution duration is compared with the set signal duration range. When the execution duration does not fall within the signal duration range, the signal transmission is executed again; and when the execution duration falls within the signal duration range, next signal transmission is continued. The execution is continued in this manner, until the entire visible light signal is transmitted, and the execution duration of transmission each time falls within the signal duration range.

For the receive end, a level in an electrical signal unit and having a same level value as a fixed level may be incorrectly continued for a time approximately equal to that of the fixed level, and seem to be a fixed level between electrical signal units. Therefore, the level having the same level value as the fixed level is considered as an error sensitive level, and needs to be determined particularly.

At the receive end, firstly, a visible light signal is received and converted into an electrical signal. Then a level of the electrical signal is detected. When it is detected that a duration of an error sensitive level in the electrical signal falls within a signal duration range, the error sensitive level is recorded; and when it is detected that the duration of the error sensitive level in the electrical signal does not fall within the signal duration range, the error sensitive level is not recorded. Then recorded levels are converted into binary data respectively, the binary data is combined.

It should be noted that a light emitting diode is used as an example for describing the embodiments of the present application. However, it is understandable that the embodiments of the present application may be applied to other emitters having a similar random delay characteristic.

The present application to be protected is hereinafter described with reference to the accompanying drawings, and in all the accompanying drawings, same reference numbers are used to indicate same components or steps. In the following description, for the purpose of explanation, multitudinous specific details are disclosed to provide a comprehensive understanding about the subject matter to be protected. However, apparently, the present application may also be implemented without using these specific details.

Embodiment 1

FIG. 1 shows a flowchart of an error retransmission mechanism-included method for transmitting a visible light signal according to Embodiment 1 of the present application. Referring to FIG. 1, a process is as follows:

Step 101: Encode to-be-transmitted information into an electrical signal according to an encoding mode of bit value grouping.

In this embodiment, the electrical signal may include multiple electrical signal units, where for each electrical signal unit, a quantity of level transitions is used to represent one or multiple bits, and an inter-group interval indicated by a fixed level exists between adjacent electrical signal units. In this embodiment, a rising edge or a falling edge of a level may be used as a start of a transition.

For example, a duration of a high (or low) level in an electrical signal unit is 2 ms. Each electrical signal unit has four level transitions, including low-level to high-level transitions and high-level to low-level transitions. Each electrical signal unit indicates 2-bit information, and four electrical signal units constitute one byte. When a quantity of low-level to high-level transitions and high-level to low-level transitions in an electrical signal unit is 1, it represents information 00; when a quantity of low-level to high-level transitions and high-level to low-level transitions is 2, it represents information 01; when a quantity of low-level to high-level transitions and high-level to low-level transitions is 3, it represents information 10; and when a quantity of low-level to high-level transitions and high-level to low-level transitions is 4, it represents information 11. A correspondence between a quantity of low-level to high-level transitions and high-level to low-level transitions and information represented by the quantity is shown in Table 1.

TABLE 1

| Quantity of level transitions | 1 | 2 | 3 | 4 |
|---|---|---|---|---|
| Information (2 bits) | 00 | 01 | 10 | 11 |

Certainly, each electrical signal unit may indicate 1-bit information, and this requires a maximum of two transitions. By analogy, each electrical signal unit may indicate 3-bit information, and this requires a maximum of eight transitions.

Figure 3:
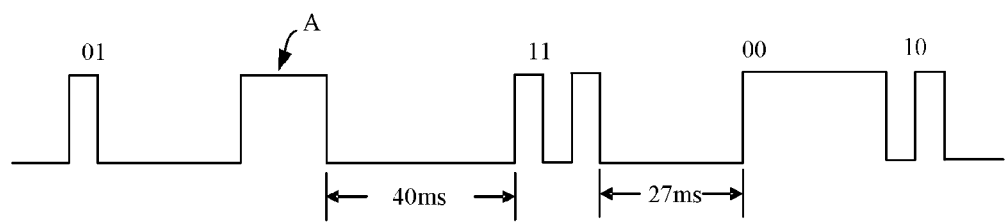
FIG. 3 shows an exemplary encoded electrical signal in visible light communication according to Embodiment 1 of the present application.

FIG. 3 shows an exemplary encoded electrical signal. In the figure, a schematic diagram of a relationship between bit value and level is shown. In the figure, four electrical signal units represent 01, 11, 00, and 10 respectively. A duration of a high (or low) level between two adjacent electrical signal units is 27 ms. The signal after combination is one byte, and is indicated as 01110010 in binary notation, and a corresponding hexadecimal signal is 0x72.

Step 102: Use the electrical signal to control a light emitting diode, so that transmission is performed in a visible light signal form.

Step 103: During transmission of a visible light signal, when the light emitting diode executes a signal transmission action on a high level or a low level in an electrical signal unit each time, read an execution duration of the light emitting diode.

In this embodiment, because fixed levels between electrical signal units may be high levels and low levels, error sensitive levels are high levels and low levels in the electrical signal unit correspondingly. That is, when the light emitting diode executes a turn-on action on a high level in the electrical signal unit each time, the execution duration of the light emitting diode is read; and when the light emitting diode executes a turn-off action on a low level in the electrical signal unit each time, the execution duration of the light emitting diode also needs to be read.

The light emitting diode is generally controlled by using a control code by an electronic device in which the light emitting diode is disposed. Therefore, a manner of reading the execution duration of the light emitting diode is reading, by the electronic device, an execution duration of the control code of the light emitting diode. More specifically, a code execution duration reading code may be added before and after the control code to read the execution duration.

Step 104: Compare the execution duration with a set signal duration range.

The set signal duration range includes a signal duration range for the light emitting diode to perform signal transmission on the high level or low level for a time. The signal transmission of the light emitting diode at a time is a turn-on action or a turn-off action. The signal duration range is a duration range of the turn-on action or turn-off action.

In addition, for the encoding mode in this embodiment, a duration (herein referred to as an intra-group duration) of a high or low level in an electrical signal unit, a duration (herein referred to as an inter-group duration) of a high or low level between two adjacent electrical signal units, and a signal duration of the entire electrical signal may be set.

Herein a lower limit of the signal duration range needs to be less than or equal to the intra-group duration, and an upper limit of the signal duration range needs to be greater than the intra-group duration but less than the inter-group duration.

For example, a signal duration range in which an LED is on/off is set to 2-10 ms, an intra-group duration is set to 2 ms, an inter-group duration is set to 25 ms, and a signal duration is set to 60 ms.

Step 105: When the execution duration falls within the signal duration range, consider that transmission is correct, and continue next signal transmission.

For example, when it is found that the execution duration in which the light emitting diode transmits the high level in the electrical signal unit is 2 ms, which falls within the range of 2-10 ms, it is considered that transmission is correct, and next signal transmission is continued.

Step 106: When the execution duration does not fall within the signal duration range, consider that transmission is incorrect, and execute the signal transmission again.

Because electrical signals are grouped, when a signal is retransmitted, a visible light signal corresponding to a current information unit is retransmitted. That is, it is necessary to retransmit only a group of 2-bit information.

In addition, before retransmission, a retransmission interval needs to be transmitted, and then retransmission is executed. A length of the retransmission interval is different from the inter-group interval, for example, may be 1.5 times the inter-group interval.

For example, when it is found in FIG. 3 that the execution duration in which the light emitting diode transmits a high level A in the electrical signal unit is 12 ms, the execution duration does not fall within the range of 2-10 ms, and it is considered that transmission is incorrect, and the electrical signal unit is retransmitted after a transmission interval of 40 ms.

The execution is continued in this manner, until the entire visible light signal is transmitted, and the execution duration of transmission each time falls within the signal duration range.

Figure 2:
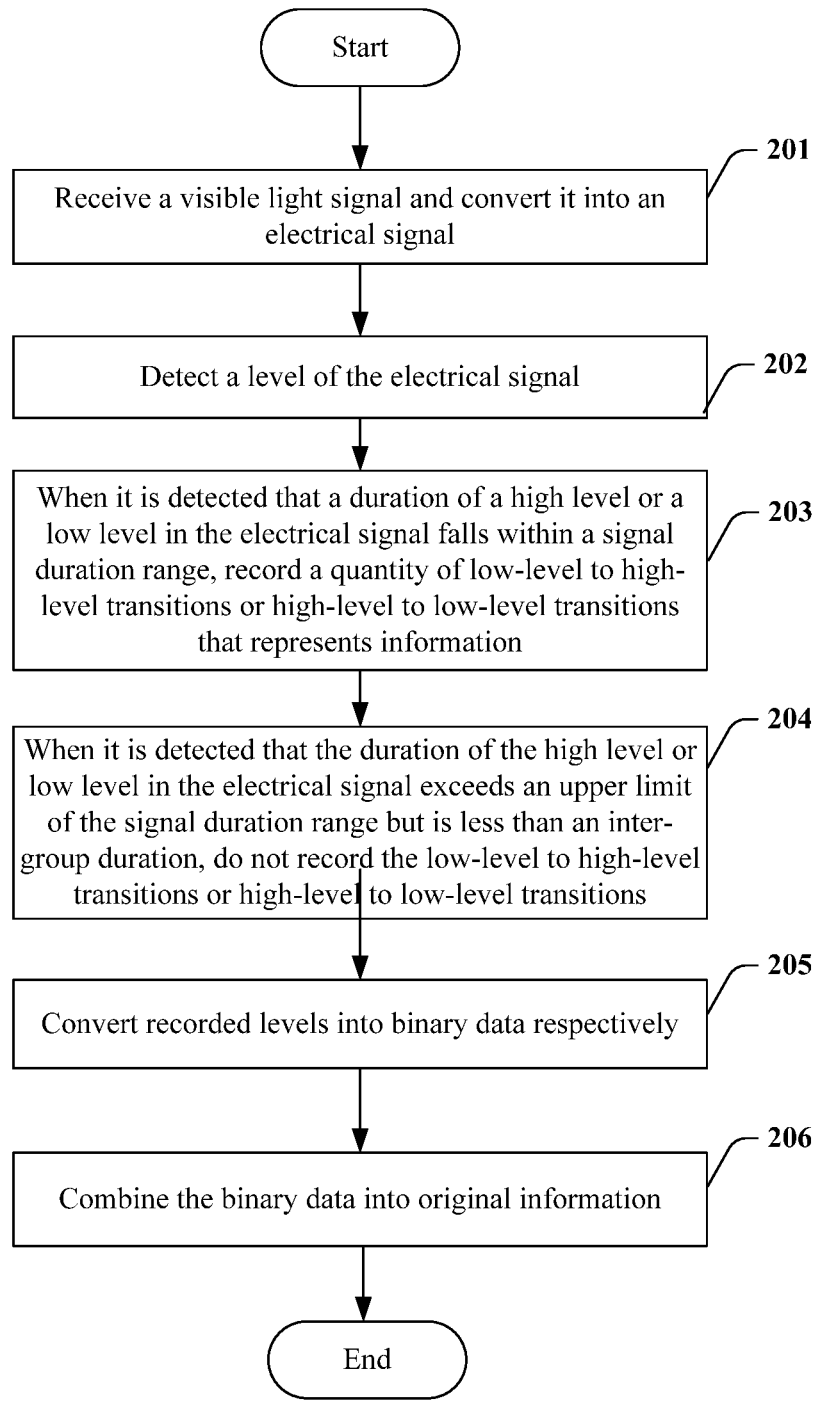
FIG. 2 shows a flowchart of a method for receiving a visible light signal according to Embodiment 1 of the present application.

FIG. 2 shows a flowchart of a method for receiving a visible light signal according to Embodiment 1 of the present application. Referring to FIG. 2, a process is as follows:

Step 201: Receive a visible light signal and convert it into an electrical signal.

Step 202: Detect a level of the electrical signal. And start timing when a low-level to high-level transition or a high-level to low-level transition is detected.

Step 203: When it is detected that a duration of a high level or a low level in the electrical signal falls within a signal duration range, record a quantity of low-level to high-level transitions or high-level to low-level transitions that represents information.

In this embodiment, because fixed levels between electrical signal units may be high levels and low levels, error sensitive levels are high levels and low levels correspondingly, including high levels and low levels in an electrical signal unit and between electrical signal units. That is, when a light emitting diode executes a turn-on action on a high level each time, an execution duration of the light emitting diode is read; and when the light emitting diode executes a turn-off action on a low level each time, an execution duration of the light emitting diode also needs to be read.

Step 204: When it is detected that the duration of the high level or low level in the electrical signal exceeds an upper limit of the signal duration range but is less than an inter-group duration, do not record the low-level to high-level transitions or high-level to low-level transitions.

Herein the abandoned record includes previous level transitions of a current electrical signal unit. After the record is abandoned, retransmission of a transmit end is waited for. When a retransmission interval different from the inter-group interval is detected, level transitions of the current electrical signal unit are recorded again.

In addition, when the duration of the high or low level is greater than or equal to the inter-group duration but less than or equal to a signal duration, it is determined that a group of signals ends. When the duration of the high or low level is greater than the signal duration, it is determined that the electrical signal ends.

For example, an intra-group duration range, the inter-group duration, and the signal duration are set to 2-10 ms, 25 ms, and 60 ms respectively. When a rising edge or a falling edge is detected, timing is started. When the duration of the detected high or low level is greater than 2 ms but less than or equal to 10 ms, a quantity of low-level to high-level transitions or high-level to low-level transitions that represents information is recorded; when the duration of the detected high or low level is greater than 10 ms but less than or equal to 25 ms, the group of low-level to high-level transitions or high-level to low-level transitions is not recorded, and retransmission is waited for; when the duration of the detected high or low level is greater than or equal to 25 ms but less than or equal to 60 ms, it is considered that an electrical signal unit ends; and when the duration of the detected high or low level is greater than 60 ms, it is considered that the entire electrical signal ends.

In another case, that the duration of the high or low level is greater than the signal duration may also represent interruption of signal reception and restart of signal detection.

Step 205: Convert recorded levels into binary data respectively.

Step 206: Combine the binary data into original information.

In the method for transmitting a visible light signal according to this embodiment, information is divided into several electrical signal units, and durations of high or low levels are used to distinguish between the electrical signal units. In an electrical signal unit, a quantity of low-level to high-level transitions or high-level to low-level transitions is used to represent information. The signal is transmitted by an LED in a visible light form. After the LED is controlled to be on or off each time, an execution duration of the turn-on or turn-off is read. If the execution duration exceeds a signal duration range, the information is retransmitted until the group of information is transmitted completely. A receive end determines, by timing, that signal reception ends, or that reception is interrupted, or that reception is complete, and records a quantity of low-level to high-level transitions or high-level to low-level transitions that represents information in an electrical signal unit. Because a transmission error may be detected and retransmission is performed, this embodiment may improve reliability of communication between a transmit end and a receive end of a visible light signal, and thereby improve user experience.

Embodiment 2

Figure 4:
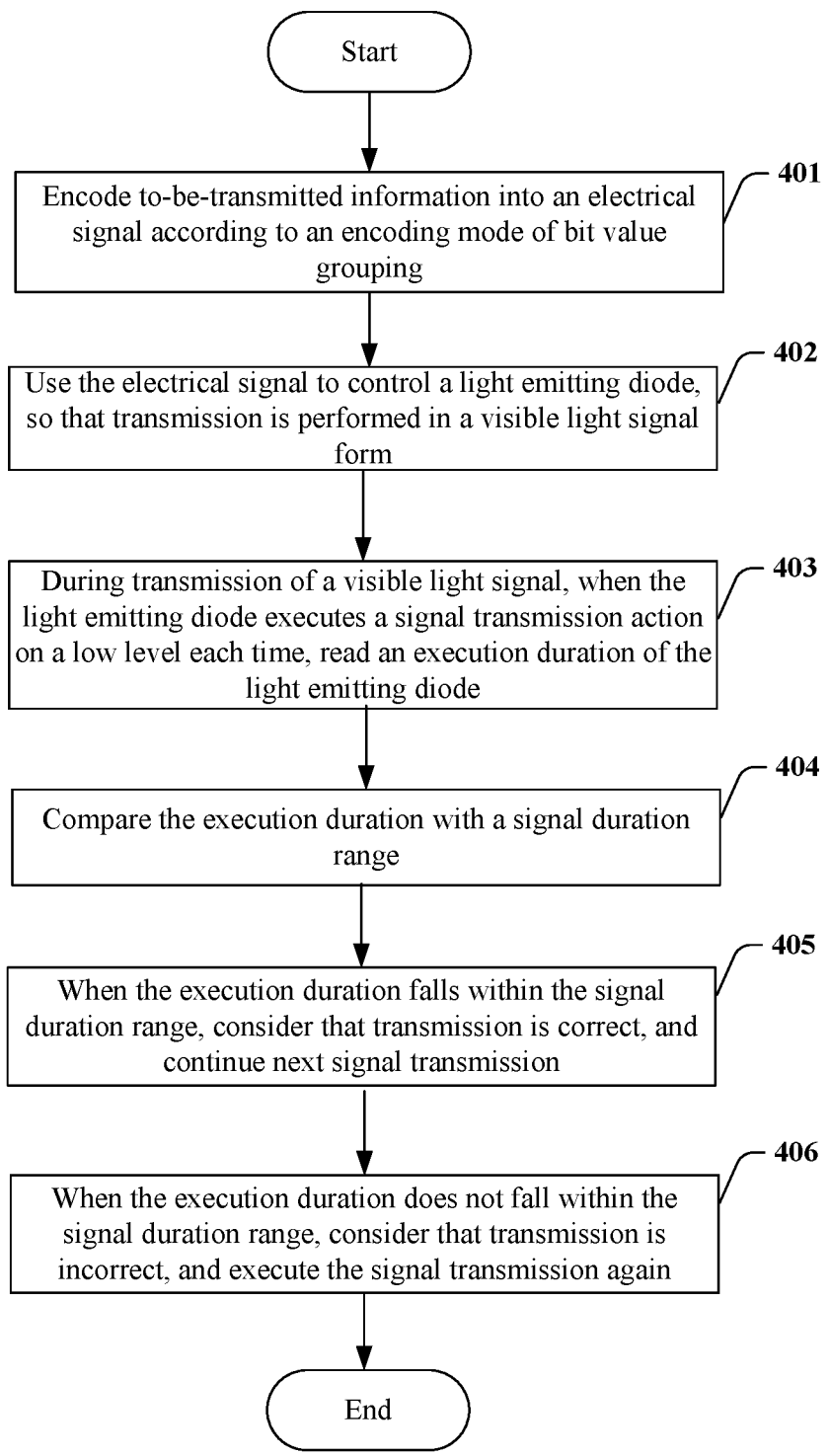
FIG. 4 shows a flowchart of an error retransmission mechanism-included method for transmitting a visible light signal according to Embodiment 2 of the present application.

FIG. 4 shows a flowchart of an error retransmission mechanism-included method for transmitting a visible light signal according to Embodiment 2 of the present application. Referring to FIG. 4, a process is as follows:

Step 401: Encode to-be-transmitted information into an electrical signal according to an encoding mode of bit value grouping.

In this embodiment, the electrical signal may include multiple electrical signal units, where for each electrical signal unit, a quantity of high levels is used to represent one or multiple bits, and an interval indicated by a low level exists between adjacent electrical signal units.

For example, a duration of a low level in an electrical signal unit is 2 ms, and each electrical signal unit has a maximum of four high levels. Each electrical signal unit indicates 2-bit information, and four electrical signal units constitute one byte. When a quantity of high levels in an electrical signal unit is 1, it represents information 00; when a quantity of high levels is 2, it represents information 01; when a quantity of high levels is 3, it represents information 10; and when a quantity of high levels is 4, it represents information 11. A correspondence between a quantity of high levels and information represented by the quantity is shown in Table 2.

TABLE 2

| Quantity of high levels | 1 | 2 | 3 | 4 |
|---|---|---|---|---|
| Information (2 bits) | 00 | 01 | 10 | 11 |

Certainly, each electrical signal unit may indicate 1-bit information, and this requires a maximum of two high levels. By analogy, each electrical signal unit may indicate 3-bit information, and this requires a maximum of eight high levels.

Figure 6:
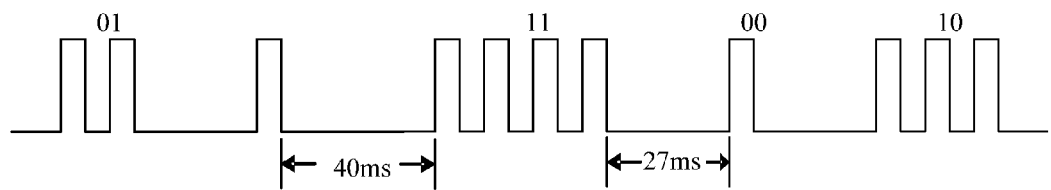
FIG. 6 shows an exemplary encoded electrical signal in visible light communication according to Embodiment 2 of the present application.

FIG. 6 shows an exemplary encoded electrical signal. In the figure, a schematic diagram of a relationship between bit value and level is shown. In the figure, four electrical signal units represent 01, 11, 00, and 10 respectively. A duration of a high (or low) level between two adjacent electrical signal units is 27 ms. The signal after combination is one byte, and is indicated as 01110010 in binary notation, and a corresponding hexadecimal signal is 0x72.

Step 402: Use the electrical signal to control a light emitting diode, so that transmission is performed in a visible light signal form.

Step 403: During transmission of a visible light signal, when the light emitting diode executes a signal transmission action on a low level in an electrical signal unit each time, read an execution duration of the light emitting diode.

In this embodiment, because a fixed level between electrical signal units is a low level, an error sensitive level is a low level in the electrical signal unit correspondingly. That is, when the light emitting diode executes a turn-off action on the low level in the electrical signal unit each time, the execution duration of the light emitting diode needs to be read.

The light emitting diode is generally controlled by using a control code by an electronic device in which the light emitting diode is disposed. Therefore, a manner of reading the execution duration of the light emitting diode is reading, by the electronic device, an execution duration of the control code of the light emitting diode. More specifically, a code execution duration reading code may be added before and after the control code to read the execution duration.

Step 404: Compare the execution duration with a set signal duration range.

The set signal duration range is a signal duration range for the light emitting diode to perform signal transmission on the low level for a time. The signal transmission of the light emitting diode at a time is a turn-off action. The signal duration range is a duration range of the turn-off action.

In addition, for the encoding mode in this embodiment, a duration (herein referred to as an intra-group duration) of a low level in an electrical signal unit, a duration (herein referred to as an inter-group duration) of a low level between two adjacent electrical signal units, and a signal duration of the entire electrical signal may be set.

Herein a lower limit of the signal duration range needs to be less than or equal to the intra-group duration, and an upper limit of the signal duration range needs to be greater than the intra-group duration but less than the inter-group duration.

For example, a signal duration range in which an LED is off is set to 2-10 ms, an intra-group duration is set to 2 ms, an inter-group duration is set to 25 ms, and a signal duration is set to 60 ms.

Step 405: When the execution duration falls within the signal duration range, consider that transmission is correct, and continue next signal transmission.

For example, when it is found that the execution duration in which the light emitting diode transmits the low level in the electrical signal unit is 2 ms, which falls within the range of 2-10 ms, it is considered that transmission is correct, and next signal transmission is continued.

Step 406: When the execution duration does not fall within the signal duration range, consider that transmission is incorrect, and execute the signal transmission again.

Because electrical signals are grouped, when a signal is retransmitted, a visible light signal corresponding to a current information unit is retransmitted. That is, it is necessary to retransmit only a group of 2-bit information.

In addition, before retransmission, a retransmission interval needs to be transmitted, and then retransmission is executed. A length of the retransmission interval is different from the inter-group interval, for example, may be 1.5 times the inter-group interval.

For example, when it is found that the execution duration in which the light emitting diode transmits the low level in the electrical signal unit is 22 ms, the execution duration does not fall within the range of 2-10 ms, and it is considered that transmission is incorrect and the signal transmission is executed again after a transmission interval of 40 ms.

Referring to FIG. 6, when a second electrical signal unit is transmitted, a transmission error is found, and the second electrical signal unit is retransmitted.

The execution is continued in this manner, until the entire visible light signal is transmitted, and the execution duration of transmission each time falls within the signal duration range.

Figure 5:
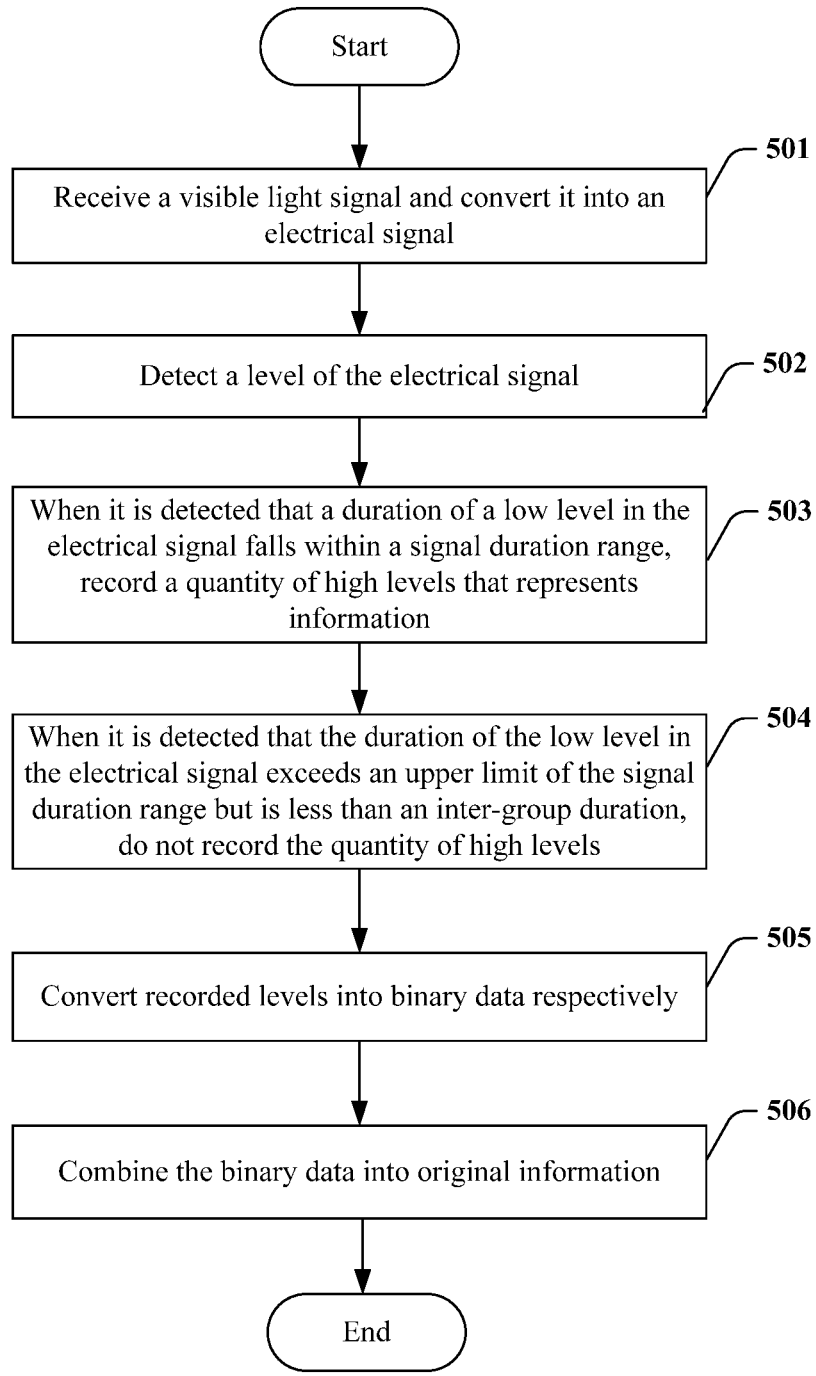
FIG. 5 shows a flowchart of a method for receiving a visible light signal according to Embodiment 2 of the present application.

FIG. 5 shows a flowchart of a method for receiving a visible light signal according to Embodiment 2 of the present application. Referring to FIG. 5, a process is as follows:

Step 501: Receive a visible light signal and convert it into an electrical signal.

Step 502: Detect a level of the electrical signal. Star timing when a high-level to low-level transition is detected.

Step 503: When it is detected that a duration of a low level in the electrical signal falls within a signal duration range, record a quantity of high levels that represents information.

In this embodiment, because fixed levels between electrical signal units are low levels, error sensitive levels are low levels correspondingly, including low levels in an electrical signal unit and low levels between electrical signal units. That is, when a light emitting diode executes a turn-off action on a low level each time, the execution duration of the light emitting diode is read.

Step 504: When it is detected that the duration of the low level in the electrical signal exceeds an upper limit of the signal duration range but is less than an inter-group duration, do not record the quantity of high levels.

Herein the abandoned record includes a quantity of previous high levels of a current electrical signal unit. After the record is abandoned, retransmission of a transmit end is waited for. When a retransmission interval different from the inter-group interval is detected, level transitions of the current electrical signal unit are recorded again.

In addition, when the duration of the low level is greater than or equal to the inter-group duration but less than or equal to a signal duration, it is determined that a group of signals ends. When the duration of the low level is greater than the signal duration, it is determined that the electrical signal ends.

For example, an intra-group duration range, the inter-group duration, and the signal duration are set to 2-10 ms, 25 ms, and 60 ms respectively. When a falling edge is detected, timing is started. When the duration of the detected low level is greater than 2 ms but less than or equal to 10 ms, a quantity of high levels that represents information is recorded; when the duration of the detected low level is greater than 10 ms but less than 25 ms, the quantity of high levels of the electrical signal unit is not recorded, and retransmission of the electrical signal unit is waited for; when the duration of the detected low level is greater than or equal to 25 ms but less than or equal to 60 ms, it is considered that the electrical signal unit ends; and when the duration of the detected low level is greater than 60 ms, it is considered that the entire electrical signal ends.

In another case, that the duration of the low level is greater than the signal duration may also represent interruption of signal reception and restart of signal detection.

Step 505: Convert recorded levels into binary data respectively.

Step 506: Combine the binary data into original information.

In the method for transmitting a visible light signal according to this embodiment, information is divided into several electrical signal units, and durations of low levels are used to distinguish between the electrical signal units. In an electrical signal unit, a quantity of high levels is used to represent information. The signal is transmitted by an LED in a visible light form. After the LED is controlled to be turned off each time, an execution duration of the turn-off is read. If the execution duration exceeds a signal duration range, the information is retransmitted until the group of information is transmitted completely. A receive end determines, by timing, that signal reception ends, or that reception is interrupted, or that reception is complete, and records a quantity of high levels that represents information in an electrical signal unit. Because a transmission error may be detected and retransmission is performed, this embodiment may improve reliability of communication between a transmit end and a receive end of a visible light signal, and thereby improve user experience.

Embodiment 3

Figure 7:
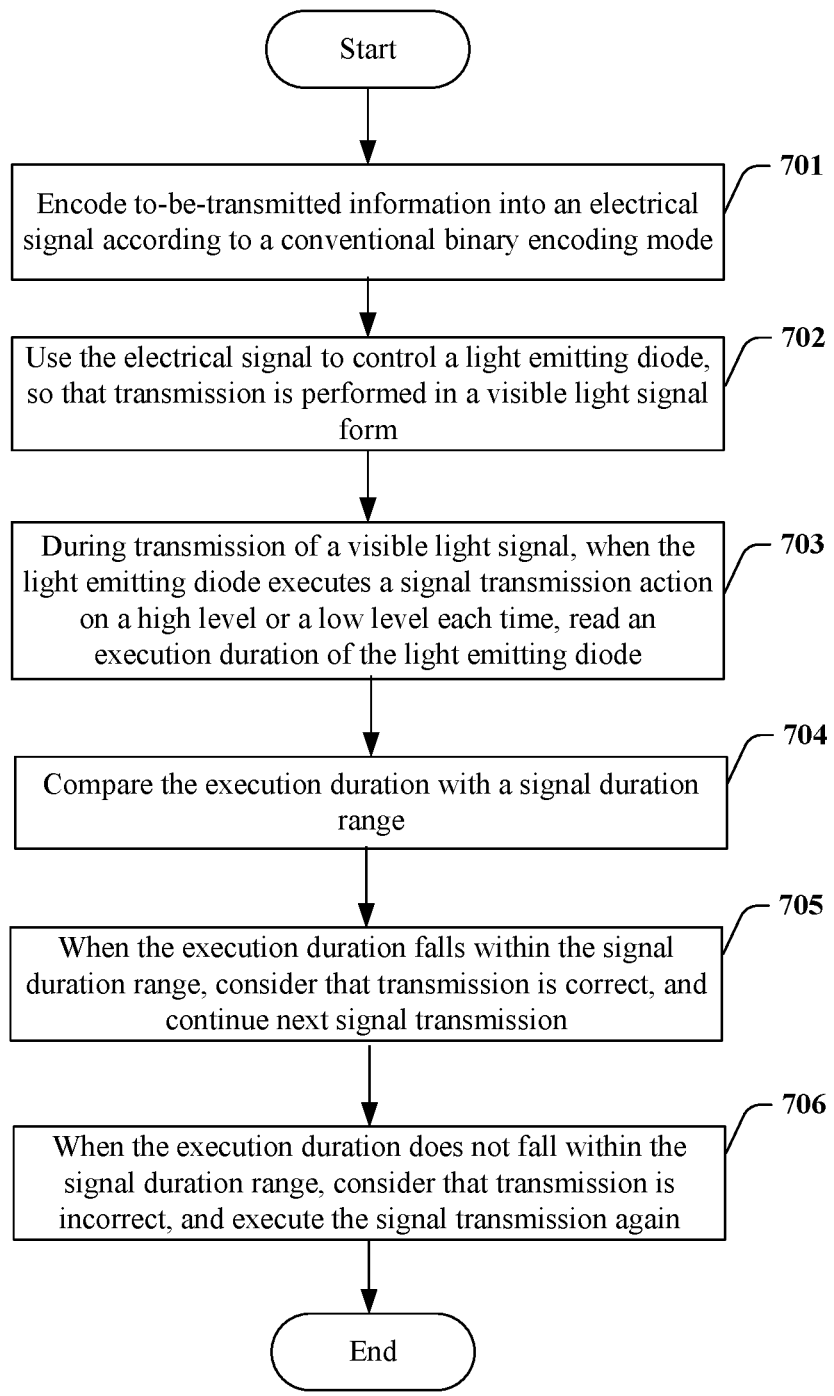
FIG. 7 shows a flowchart of an error retransmission mechanism-included method for transmitting a visible light signal according to Embodiment 3 of the present application.

FIG. 7 shows a flowchart of an error retransmission mechanism-included method for transmitting a visible light signal according to Embodiment 3 of the present application. Referring to FIG. 7, a process is as follows:

Step 701: Encode to-be-transmitted information into an electrical signal according to a conventional binary encoding mode.

Figure 9:
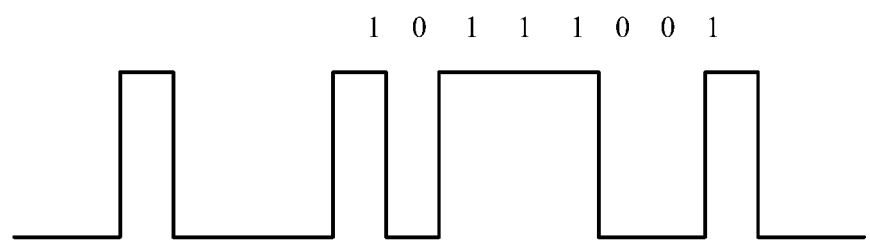
FIG. 9 shows an exemplary encoded electrical signal in visible light communication according to Embodiment 3 of the present application.

For example, a low level represents binary 0, and a high level represents binary 1. FIG. 9 shows an exemplary encoded electrical signal.

Step 702: Use the electrical signal to control a light emitting diode, so that transmission is performed in a visible light signal form.

Step 703: During transmission of a visible light signal, when the light emitting diode executes a signal transmission action on a high level or a low level each time, read an execution duration of the light emitting diode.

In this embodiment, because a level of an electrical signal unit may be a high level or a low level, an error sensitive level is a high level or a low level correspondingly. That is, when the light emitting diode executes a turn-on action on a high level each time, the execution duration of the light emitting diode is read; and when the light emitting diode executes a turn-off action on a low level each time, the execution duration of the light emitting diode also needs to be read.

The light emitting diode is generally controlled by using a control code by an electronic device in which the light emitting diode is disposed. Therefore, a manner of reading the execution duration of the light emitting diode is reading, by the electronic device, an execution duration of the control code of the light emitting diode. More specifically, a code execution duration reading code may be added before and after the control code to read the execution duration.

Step 704: Compare the execution duration with a set signal duration range.

The set signal duration range is a signal duration range for the light emitting diode to perform signal transmission on the high level or low level for a time. The signal transmission of the light emitting diode at a time is a turn-on action or a turn-off action. The signal duration range is a duration range of the high level or low level.

For example, for transmission of a single 1 or 0, a signal duration range in which an LED is on or off is set to 4±0.5 ms, and a duration is set to 4 ms.

When a signal of continuous 1s or continuous 0s is transmitted, the signal duration in which the LED is on or off becomes the signal duration range multiplied by a quantity of continuous 1s or continuous 0s, and the set duration becomes the set duration of the single 1 or 0 multiplied by the quantity of continuous is or continuous 0s.

Step 706: When the execution duration falls within the signal duration range, consider that transmission is correct, and continue next signal transmission.

For example, when it is found that the execution duration in which the light emitting diode transmits the high level is 3.7 ms, the execution duration falls within the range of 4±0.5 ms, and it is considered that transmission is correct, and next signal transmission is continued.

Step 707: When the execution duration does not fall within the signal duration range, consider that transmission is incorrect, and execute the signal transmission again.

Because electrical signals are not grouped but correspond to continuous binary bits, when a signal is retransmitted, a visible light signal corresponding to an entire information sequence is retransmitted. For example, when it is found that the execution duration in which the light emitting diode transmits the high level is 3.3 ms, the execution duration does not fall within the range of 4±0.5 ms, and it is considered that transmission is incorrect, and transmission of the information sequence is executed again.

The execution is continued in this manner, until the entire visible light signal is transmitted, and the execution duration of transmission each time falls within the signal duration range.

As shown in FIG. 9, a terminal device transmits 8-bit information, 10111001, where retransmission is performed for a time.

Figure 8:
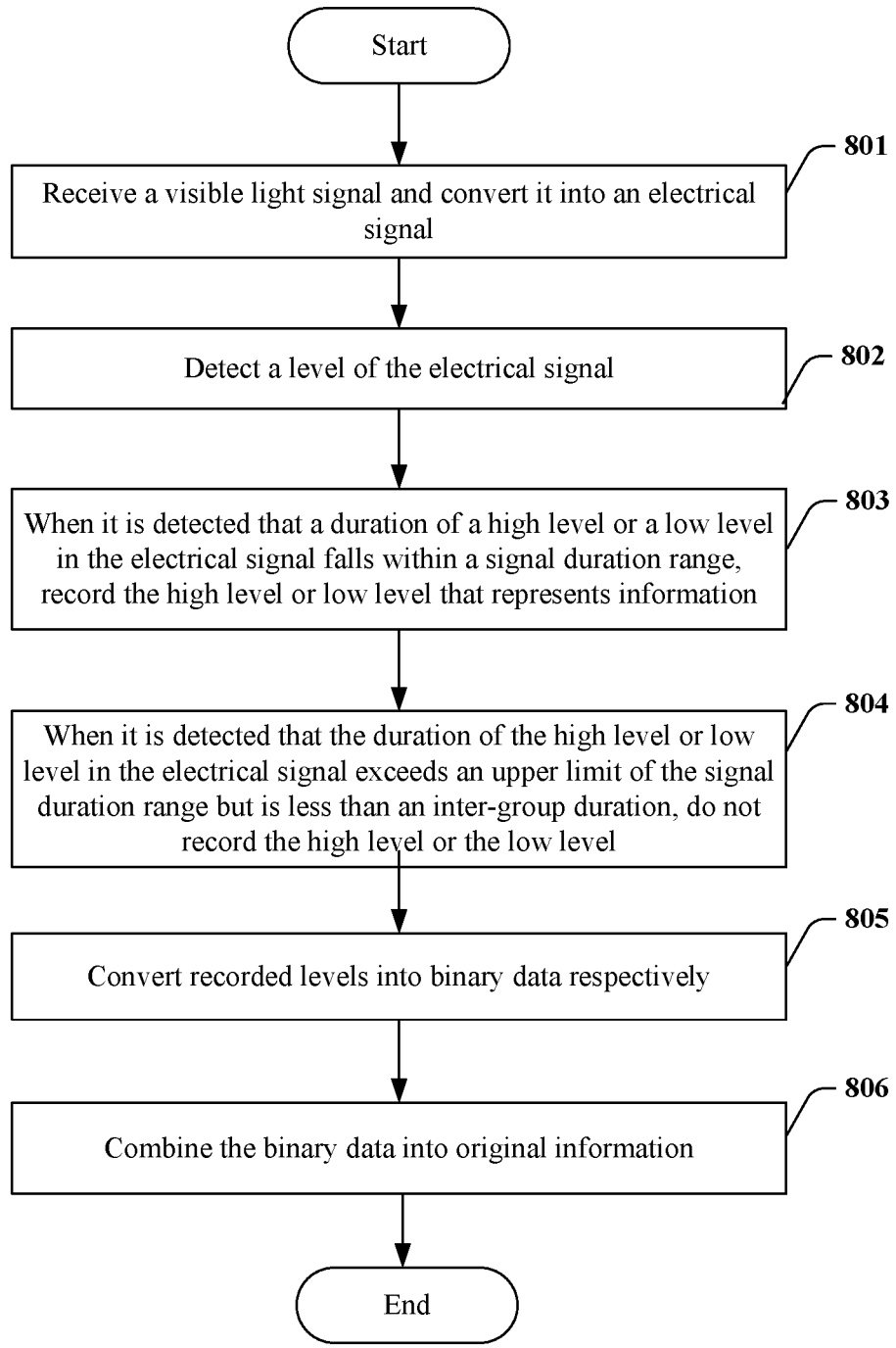
FIG. 8 shows a flowchart of a method for receiving a visible light signal according to Embodiment 3 of the present application.

FIG. 8 shows a flowchart of a method for receiving a visible light signal according to Embodiment 3 of the present application. Referring to FIG. 8, a process is as follows:

Step 801: Receive a visible light signal and convert it into an electrical signal.

Step 802: Detect a level of the electrical signal.

Specifically, a reciprocal of the foregoing set duration is used as a sampling frequency to make a sampling decision on the received level. For example, 250 Hz is used as a sampling frequency to make a sampling decision on the received level.

Step 803: When it is detected that a duration of a high level or a low level in the electrical signal falls within a signal duration range, record the high level or low level that represents information.

In this embodiment, because a level of an electrical signal unit may be a high level or a low level, an error sensitive level is a high level or a low level correspondingly. That is, when a light emitting diode executes a turn-on action on a high level each time, the execution duration of the light emitting diode is read; and when the light emitting diode executes a turn-off action on a low level each time, the execution duration of the light emitting diode also needs to be read.

Step 804: When it is detected that the duration of the high level or low level in the electrical signal exceeds an upper limit of the signal duration range but is less than an intergroup duration, do not record the high level or the low level.

The high level or low level of the abandoned record includes a level of an entire information sequence. After the record is abandoned, retransmission of a transmit end is waited for. When a new level is detected, level transitions of a current electrical signal unit are recorded again.

Step 805: Convert recorded levels into binary data respectively.

Step 806: Combine the binary data into original information.

In the method for transmitting a visible light signal according to this embodiment, presence of light emitted by an LED is used to represent a signal 1, and absence of light emitted by the LED is used to represent a signal 0. After the LED is controlled to emit light each time, an execution duration in which the LED is on or off is read; if the execution duration exceeds a signal duration range, the information is retransmitted, until the group of information is transmitted completely, and the execution duration of controlling the LED to be on or off each time is within the signal duration range. A receive end uses a reciprocal of a set duration as a sampling frequency to make a sampling decision on the received level. Because a transmission error may be detected and retransmission is performed, this embodiment may improve reliability of communication between a transmit end and a receive end of a visible light signal, and thereby improve user experience.

An embodiment of the present application further provides an error retransmission mechanism-included apparatus for transmitting a visible light signal, where the apparatus includes: a module configured to read an execution duration of an emitter during transmission of a visible light signal when the emitter executes signal transmission on an error sensitive level each time; a module configured to compare the execution duration with a signal duration range; a module configured to perform signal retransmission when the execution duration does not fall within the signal duration range; and a module configured to continue signal transmission when the execution duration falls within the signal duration range.

The manner of reading the execution duration of the emitter includes: reading an execution duration of a control code of the emitter.

A signal transmission action of the emitter is a turn-on action or a turn-off action.

The apparatus further includes a module configured to encode to-be-transmitted information into an electrical signal.

The module configured to encode to-be-transmitted information into an electrical signal uses the electrical signal to control the emitter, so that transmission is performed in a visible light signal form.

The apparatus further includes a module configured to set the signal duration range for the emitter to perform signal transmission on the error sensitive level for a time.

The encoding includes: dividing the to-be-transmitted information into multiple information units, where each information unit includes one or multiple bits; and converting the multiple information units into multiple electrical signal units, where for each electrical signal unit, a quantity of level transitions is used to represent the one or multiple bits of a corresponding information unit, and an inter-group interval indicated by a fixed level exists between adjacent electrical signal units.

The encoding includes: dividing the to-be-transmitted information into multiple information units, where each information unit includes one or multiple bits; and converting the multiple information units into multiple electrical signal units, where for each electrical signal unit, a quantity of levels is used to represent the one or multiple bits of a corresponding information unit, and an inter-group interval indicated by a fixed level exists between adjacent electrical signal units.

The error sensitive level is a level in the electrical signal unit and having a same level value as the fixed level.

The module configured to perform signal retransmission when the execution duration does not fall within the signal duration range retransmits a signal corresponding to a current information unit in the to-be-transmitted information.

Before performing signal retransmission, the module configured to perform signal retransmission when the execution duration does not fall within the signal duration range further transmits a retransmission interval, where the retransmission interval is different from the inter-group interval.

The encoding includes encoding the to-be-transmitted information into an electrical signal that indicates continuous binary bits, and the step of performing signal retransmission includes retransmitting a signal corresponding to the entire to-be-transmitted information.

An embodiment of the present application further provides an error retransmission mechanism-included apparatus for receiving a visible light signal, where the apparatus includes: a module configured to receive a visible light signal and convert it into an electrical signal; a module configured to detect a level of the electrical signal; a module configured to record an error sensitive level when it is detected that a duration of the error sensitive level in the electrical signal falls within a signal duration range; a module configured not to record the error sensitive level when it is detected that the duration of the error sensitive level in the electrical signal does not fall within the signal duration range; a module configured to convert recorded levels into binary data respectively; and a module configured to combine the binary data.

The electrical signal includes multiple electrical signal units, where for each electrical signal unit, a quantity of level transitions is used to represent one or multiple bits, and an inter-group interval indicated by a fixed level exists between adjacent electrical signal units.

The electrical signal includes multiple electrical signal units, where for each electrical signal unit, a quantity of levels is used to represent one or multiple bits, and an inter-group interval indicated by a fixed level exists between adjacent electrical signal units.

The error sensitive level is a level having a same level value as the fixed level.

The apparatus further includes a module configured to abandon a recorded level of a current electrical signal unit when it is detected that the duration of the error sensitive level in the electrical signal does not fall within the signal duration range.

The apparatus further includes a module configured to record the level of the current electrical signal unit again when a retransmission interval different from the inter-group interval is detected.

The electrical signal indicates continuous binary bits, and the apparatus further includes a module configured to abandon the previously recorded level when it is detected that the duration of the error sensitive level in the electrical signal does not fall within the signal duration range.

An embodiment of the present application further provides an authentication system, where the authentication system may be an access control system, a metro system, a payment system, or a consumption management system. The authentication system includes a photonic key and a photonic controlled end, where the photonic key includes the foregoing error retransmission mechanism-included apparatus for transmitting a visible light signal, and the photonic controlled end includes the foregoing error retransmission mechanism-included apparatus for receiving a visible light signal. Using the access control system as an example, in this embodiment, the photonic key is used as a transmit end, and encoded identification data is transmitted in a visible light signal form by using an LED of the photonic key. The photonic controlled end receives the visible light signal from the photonic key. The embodiment may improve reliability of communication between a transmit end and a receive end of a visible light signal, and thereby improve user experience.

An embodiment of the present application further provides an authentication system, including the foregoing error retransmission mechanism-included apparatus for transmitting a visible light signal and the foregoing error retransmission mechanism-included apparatus for receiving a visible light signal.

Although the present application is described in detail with reference to specific embodiments, a person of ordinary skill in the art should understand that the foregoing embodiments are intended for describing the present application only, and that various equivalent changes or replacements may be made without departing from the spirit of the present application. Therefore, all changes or variations made to the foregoing embodiments without departing from the spirit of the present application shall fall within the scope of the claims of the present application.

INDUSTRIAL APPLICABILITY

Because a transmission error may be detected and retransmission is performed, the embodiments of the present application may improve reliability of communication between a transmit end and a receive end of a visible light signal, and thereby improve user experience.

What is claimed is:

1. An error retransmission mechanism-comprised method for transmitting a visible light signal, comprising the following steps:
   during transmission of a visible light signal, when a photonic key executes signal transmission on an error sensitive level each time, reading, by the photonic key, an execution duration of the photonic key;
   comparing the execution duration with a signal duration range;
   when the execution duration does not fall within the signal duration range, performing, by the photonic key, signal retransmission; and
   when the execution duration falls within the signal duration range, continuing, by the photonic key, signal transmission;
   wherein the error sensitive level refers to a level having an abnormal duration that causes an identification error at a receive end.

2. The method according to claim 1, wherein before transmitting, by the photonic key, the visible light signal, the method further comprises:
encoding, by the photonic key, to-be-transmitted information into an electrical signal according to an encoding mode.

3. The method according to claim 2, wherein the step of transmitting, by the photonic key, the visible light signal comprises using the electrical signal to control the photonic key, so that transmission is performed in a visible light signal form.

4. The method according to claim 3, wherein before using the electrical signal to control the photonic key, so that transmission is performed in a visible light signal form, the method further comprises: setting the signal duration range for the photonic key to perform signal transmission on the error sensitive level for a time.

5. The method according to claim 2, wherein the encoding mode comprises:
dividing, by the photonic key, the to-be-transmitted information into multiple information units, each information unit comprises one or multiple bits; and
converting, by the photonic key, the multiple information units into multiple electrical signal units, where for each electrical signal unit, a quantity of level transitions is used to represent the one or multiple bits of a corresponding information unit, and an inter-group interval indicated by a fixed level exists between adjacent electrical signal units.

6. The method according to claim 5, wherein the step of performing, by the photonic key, signal retransmission comprises retransmitting a signal corresponding to a current information unit in the to-be-transmitted information.

7. The method according to claim 6, wherein before performing, by the photonic key, signal retransmission, the method further comprises transmitting a retransmission interval, and the retransmission interval is different from the inter-group interval.

8. The method according to claim 2, wherein the encoding mode comprises:
dividing, by the photonic key, the to-be-transmitted information into multiple information units, each information unit comprises one or multiple bits; and
converting, by the photonic key, the multiple information units into multiple electrical signal units, where for each electrical signal unit, a quantity of levels is used to represent the one or multiple bits of a corresponding information unit, and an inter-group interval indicated by a fixed level exists between adjacent electrical signal units.

9. The method according to claim 2, wherein the encoding, by the photonic key, mode comprises encoding the to-be-transmitted information into an electrical signal that indicates continuous binary bits, and the step of performing signal retransmission comprises retransmitting a signal corresponding to the entire to-be-transmitted information.

10. An error retransmission mechanism-comprised method for receiving a visible light signal, comprising the following steps:
receiving, by a photonic controlled end, a visible light signal and converting it into an electrical signal;
detecting, by the photonic controlled end, a level of the electrical signal;
when detecting that a duration of an error sensitive level in the electrical signal falls within a signal duration range, recording, by the photonic controlled end, the error sensitive level;
when detecting that the duration of the error sensitive level in the electrical signal does not fall within the signal duration range, not recording, by the photonic controlled end, the error sensitive level;
converting, by the photonic controlled end, recorded levels into binary data respectively; and
combining, by the photonic controlled end, the binary data;
wherein the error sensitive level refers to a level having an abnormal duration that causes an identification error at a receive end.

11. The method according to claim 10, wherein the electrical signal comprises multiple electrical signal units, where for each electrical signal unit, a quantity of level transitions is used to represent one or multiple bits, and an inter-group interval indicated by a fixed level exists between adjacent electrical signal units.

12. The method according to claim 11, further comprising abandoning, by the photonic controlled end, a recorded level of a current electrical signal unit when detecting, by the photonic controlled end, that the duration of the error sensitive level in the electrical signal does not fall within the signal duration range.

13. The method according to claim 12, further comprising recording, by the photonic controlled end, the level of the current electrical signal unit again when detecting a retransmission interval different from the inter-group interval.

* * * * *